United States Patent
Schmidt

[15] 3,709,043
[45] Jan. 9, 1973

[54] MEANS FOR DETERMINING UNBALANCE IN ROTARY WORKPIECES

[72] Inventor: William G. Schmidt, 4733 Shaffer Ave., Madison, Wis. 53716

[22] Filed: May 11, 1970

[21] Appl. No.: 36,353

[52] U.S. Cl....................................................73/466
[51] Int. Cl..............................................G01m 1/08
[58] Field of Search.........73/466, 467, 487; 335/285

[56] References Cited

UNITED STATES PATENTS 2,487,035    11/1949    Weaver et al................73/466
3,016,037    1/1962    Smith........................116/124
2,992,489    7/1961    Karrels........................33/169

*Primary Examiner*—Richard C. Queisser
*Assistant Examiner*—Herbert Goldstein
*Attorney*—Keith Schoff

[57] ABSTRACT

A disc shaped indicia bearing reference target with a conically shaped permanent magnet adapted to be received in a centering hole of a ferromagnetic rotary workpiece to be balanced on a balancing machine wherein the target may be quickly affixed and removed and be repeatedly used.

2 Claims, 1 Drawing Figure

PATENTED JAN 9 1973
3,709,043
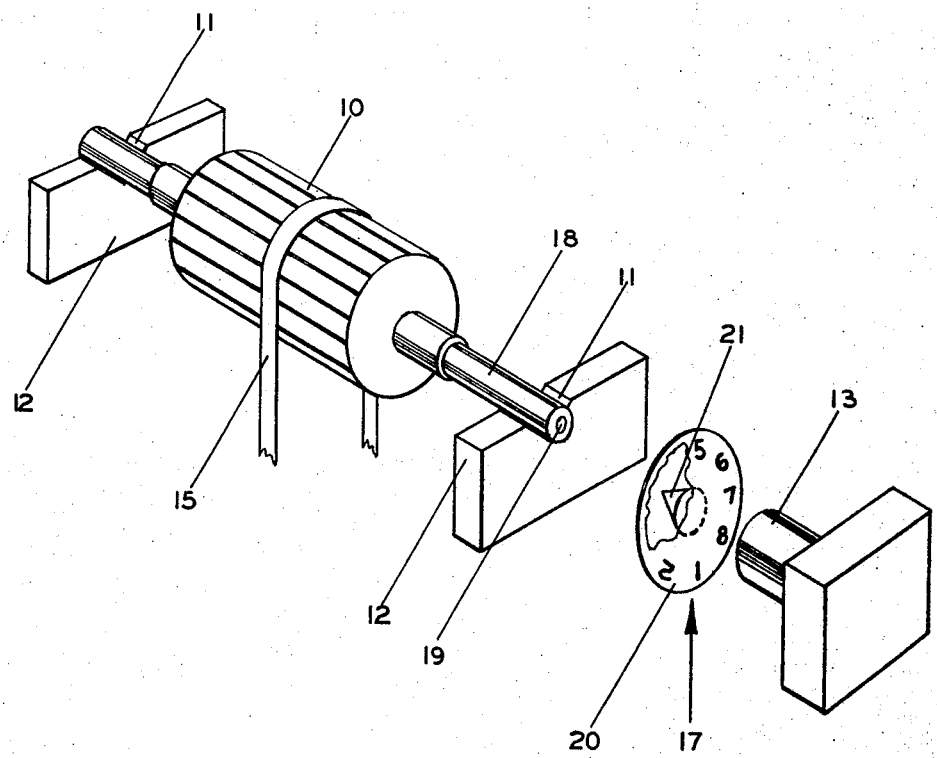
INVENTOR.
WILLIAM G. SCHMIDT
BY Keith Schoff
ATTORNEY

MEANS FOR DETERMINING UNBALANCE IN ROTARY WORKPIECES

This invention relates to a method and means for lessening the time required for balancing a rotary workpiece on a balancing machine, and more particularly relates to target means for referencing the angle of mass center eccentricity from the axis of rotation of the workpiece. Conventional balancing machine practice is to provide an endmost portion of a workpiece with reference indicia by encircling it with tape or painting it with contrastingly colored sectors to provide a reference index and then viewing the rotating workpiece in the illumination of a stroboscopic lamp either visually or by means of a photocell instrumented to show the angle of unbalance, angular reference being made to the indexing marks. The application and removal of paint or marked tape on workpieces is time consuming, bothersome and wasteful of labor and material, and can be avoided by repetitive use of a simple, quickly manipulated indexing magnet.

It is an object of this invention to provide a method and means for quickly providing reference indicies on a rotary workpiece to be balanced on a balancing machine.

It is a further object of this invention to provide indicia bearing target means which can be easily manipulated and attached to workpieces and repetitively used.

Other objects will become apparent from the following detailed description and the drawing in which FIG. 1 is a perspective view in partial cutaway of means of this invention shown together with a portion of a balancing machine.

Referring to FIG. 1, workpiece 10, shown to be an electric motor armature, is supported in "V" shaped bearings 11, moveably mounted on blocks 12. Blocks 12 are supported to be operably moveable transversely to the axis of rotation of workpiece 10 in response to forces of rotational unbalance in workpiece 10 about its axis of rotation, rotational unbalance occuring when the mass center of the workpiece is not coincident with the rotational axis. Electromagnetically induced currents are generated by movement of blocks 12, and energize stroboscopic lamp 13. Belt 15 is frictionally engaged with workpiece 10 and is driven by electric motor drive means, not shown, to rotate workpiece 10 at operable speeds which ordinarily are from about 1,000 – 2,000 r.p.m., oscillatory movement of blocks 12 occuring at similar frequency, in case of unbalance in the workpiece, with stroboscopic lamp 13 being energized at the same frequency. If desired, a photocell together with a rotatable slit aperture may be provided to precisely register the rotational angle at which lamp 13 flashes, or target 17 may be view visually, but in either case, the reading is referenced with respect to indicia on target 17. The foregoing is descriptive of conventional practice and constitutes no part of this invention.

Workpiece 10 comprises ferromagnetic shaft 18 supported in bearings 11 with conical centering hole 19, ordinarily having about a 60° apex angle, disposed in the end of shaft 18. Such centering holes are typically present in workpieces which have been machined on a lathe or the like. Target 17 as shown is partially cutaway and disposed in axial alignment with shaft 18, and comprises disc portion 20 having an indicia bearing front face and truncated conically configured permanent magnet portion 21 unitarily affixed to disc portion 20 and projecting from the rear face thereof. Target 17 is operably placed in position for use by inserting magnet portion 21 into hole 19 so that the surfaces of the hole and the magnet fay or at least engage at the basal plane of the conically configured members to provide stable alignment between the axes of shaft 18 and target 17. For use with a centering hole having a 60° apex angle, it is preferred to provide magnet portion 21 with an apex of similar angle: the apex of magnet portion 21 is truncated to prevent debris or imperfection in the bottom of hole 19 from interferring with proper seating of magnet portion 21 in hole 19, but it is not necessary that magnet portion 21 be truncated.

To set up the machine, workpiece 10 is inserted through the loop formed by endless belt 15 and placed with the ends of shaft 18 in bearings 11, blocks 12 having been adjusted to operably position bearings 11 for receiving the shaft. Target 17 is placed with magnet portion 21 disposed in hole 19 with the attraction of magnet for steel or other ferromagnetic material causing the magnet to be firmly retained when workpiece 10 is driven at speeds of several thousand revolutions per minute. An optimum size and configuration for target 17 is an aluminum disc of about 2 inches diameter and 0.01 inch thickness with numerals printed peripherally on the front face of the disc and a magnet adhered to the back face of about ⅜ inch basal diameter and shaped as a truncated cone. Any suitable magnetized material may be used for the magnet and any other suitably strong material than aluminum may be used for the disc including magnetized or ferromagnetic material. Dimensions of the target may be as great as desired limited only by dynamic forces which would cause the target to slip at operable rotational speeds.

During operation of the balancing machine, indicia observed in the illumination of stroboscopic lamp 13 serves to reference the rotational position of workpiece 10 with respect to the lateral displacement of blocks 12 at a given moment so as to enable a derivative computation to be made to establish a vector of unbalance with reference to indicia on target 17. After stock has been removed or added to the workpiece as indicated the balance of the workpiece is again checked and if within tolerance, target 17 can be removed and attached to a new workpiece for balancing. Target 17 may equally well be used to reference the radial angle of unbalance in static balancing procedures as well as in dynamic balancing, and other similar operations will be suggested to one skilled in the art from the foregoing disclosure in which the means of this invention can be used and all such obvious uses and equivalents are included in the scope of this invention. If desired, the conical magnet portion and the disc shaped face portion of the target described herein may be non-unitary, the only requirement being that they rotate unitarily. Thus, the face portion may fit around or over the magnet portion, the required function of the magnet being to keep the indicia bearing face portion axially centered with respect to rotation to prevent it from being dislodged from the workpiece by centrifugal force.

I claim:

1. A new method for using a dynamic balancing machine in which electromagnetic generating means induces energizing currents in stroboscopic lamp means in response to unbalance being sensed during rotation of a workpiece, wherein the workpiece comprises a ferromagnetic end extremity with a pilot hole disposed therein axially coincident with the axis of rotation, the steps of centering on said rotational axis by disposing at least partially within and contacting at least the basal peripheral edge of said pilot hole, a substantially conically configured permanent magnet carrying a substantially planar reference indicia bearing face free of contact with the workpiece and disposed substantially perpendicular to the rotational axis, operably rotating said workpiece, illuminating said indicia bearing face by said stroboscopic lamp means, viewing said reference indicia to reference the radial angle of unbalance in said workpiece.

2. Target means for use with a balancing machine comprising in combination a substantially conically configured permanent magnet portion adapted to be disposed with its axis coincident with the axis of rotation of a workpiece to be balanced and substantially planar indicia bearing face portion unitary with said magnet portion and disposed substantially perpendicular to said axis of said magnet portion and disposed free of contact with said workpiece.

* * * * *